United States Patent
Pellissier et al.

(10) Patent No.: US 8,962,196 B2
(45) Date of Patent: Feb. 24, 2015

(54) BIO-BATTERY WITH ENHANCED YIELD

(75) Inventors: Aymeric Pellissier, Fontaine (FR); Chantal Gondran, Grenoble (FR); Francois Lenouvel, Grenoble (FR); Philippe Cinquin, Saint Nazaire les Eymes (FR); Serge Cosnier, Crolles (FR); Stephane Mathe, Toulouse (FR)

(73) Assignees: Universite Joseph Fourier, Grenoble (FR); Centre National de la Recherche Scientifique, Paris (FR); InstitutNational des Sciences Appliquees de Toulouse, Toulouse (FR)

( * ) Notice: Subject to any disclaimer, the term of this patent is extended or adjusted under 35 U.S.C. 154(b) by 1171 days.

(21) Appl. No.: 12/936,980

(22) PCT Filed: Apr. 9, 2009

(86) PCT No.: PCT/FR2009/050639
§ 371 (c)(1), (2), (4) Date: Jan. 13, 2011

(87) PCT Pub. No.: WO2009/136092
PCT Pub. Date: Nov. 12, 2009

(65) Prior Publication Data
US 2011/0135967 A1 Jun. 9, 2011

(30) Foreign Application Priority Data

Apr. 9, 2008 (FR) ..................................... 08 52383

(51) Int. Cl.
*H01M 8/16* (2006.01)
*H01M 8/20* (2006.01)

(52) U.S. Cl.
CPC ........ *H01M 8/16* (2013.01); *H01M 8/20* (2013.01); *Y02E 60/527* (2013.01); *Y02E 60/528* (2013.01)
USPC .......................................................... 429/401

(58) Field of Classification Search
CPC ........ H01M 8/16; H01M 8/20; Y02E 60/527; Y02E 60/528
See application file for complete search history.

(56) References Cited

U.S. PATENT DOCUMENTS

| 5,834,272 | A | * | 11/1998 | Righetti ........................ 435/174 |
| 2005/0049313 | A1 | | 3/2005 | Nishizawa et al. |
| 2005/0208343 | A1 | * | 9/2005 | Kim et al. .......................... 429/2 |
| 2009/0159455 | A1 | * | 6/2009 | Logan et al. .................. 205/343 |

FOREIGN PATENT DOCUMENTS

| JP | 2006-331706 | 12/2006 |
| WO | WO 03/067697 | 8/2003 |
| WO | WO 03/106966 | 12/2003 |

OTHER PUBLICATIONS

English language translation of the Written Opinion of the International Searching Authority received in Appln. No. PCT/FR2009/050639.
(Continued)

*Primary Examiner* — Raymond Alejandro
(74) *Attorney, Agent, or Firm* — Vedder Price PC (57) ABSTRACT

A novel cell including first and second chambers containing a solvent and separated by a wall permeable to the solvent and impermeable to hydronium and/or hydroxyl ions; a first electrode in the first chamber; a second electrode in the second chamber; a first redox couple in the first chamber comprising a first oxidizer and a first reducer taking part in first oxidation-reduction reactions resulting in an electron exchange with the first electrode; a second redox couple in the second chamber comprising a second oxidizer and a second reducer taking part in second oxidation-reduction reactions resulting in an electron exchange with the second electrode, the wall being impermeable to the first and second redox couples; and first enzymes or first microorganisms placed in the first or second chamber and promoting a third oxidation-reduction reaction resulting transforming a first substance to a second substance comprising acid or alkaline species.

16 Claims, 5 Drawing Sheets

(56) References Cited

OTHER PUBLICATIONS

PCT International Search Report received in PCT/FR2009/050639 dated Sep. 22, 2009.
Behera et al., "Performance of microbial fuel cell in response to change in sludge loading rate at different anodic feed pH", *Bioresource Technology*, vol. 100, pp. 5114-5121 (2009).
Brunel et al., "Oxygen transport through laccase biocathodes for a membrane-less glucose/$O_2$ biofuel cell", *Electrochemistry Communications*, vol. 9, pp. 331-336 (2007).
Bullen et al., "Biofuel cells and their development", *Biosensors Bioelectronics*, vol. 21, pp. 2015-2045 (2006).
He et al., "Effect of electrolyte pH on the rate of the anodic and cathodic reactions in an air-cathode microbial fuel cell", *Bioelectrochemistry*, vol. 74, pp. 78-82 (2008).

* cited by examiner

BIO-BATTERY WITH ENHANCED YIELD

FIELD OF THE INVENTION

The present invention relates to biofuel cells, that is, fuel cells which use enzymes or microorganisms (bacteria, yeasts) to convert part of the power available in a biodegradable substrate into electricity.

DISCUSSION OF PRIOR ART

Generally, a biofuel cell is formed of an anode comprising an electrode placed within a chamber containing enzymes and a biodegradable substrate, such as glucose, acetate, etc. Enzymes ensure the transformation of the substrate into $CO_2$, protons, and electrons, the latter being captured by the anode electrode of the biofuel cell. To improve the electron transfer towards the anode electrode, redox mediators may be used. A biofuel cell also comprises a cathode at which an electron acceptor is reduced. As an example, the cathode comprises an electrode placed in a chamber supplied with air, the dioxygen being reduced into water. Reduction reactions implying enzymes and redox mediators may also be provided at the cathode. The biofuel cell electrodes are connected to a load, while an ion bridge ensures the transfer of ions between the anode and the cathode.

The biofuel cells currently provided by most research groups essentially differ by the selection of the biodegradable substrate, of the enzymes taking part in the substrate degradation, and by the use or not of redox mediators at the cathode and/or at the anode.

An example of a biofuel cell is described in publication "Oxygen transport through laccase biocathodes for a membrane-less glucose/$O_2$ biofuel cell" of L. Brunel, J. Denele, K. Servat, K. B. Kokoh, C. Jolivalt, C. Innocent, M. Cretin, M. Rolland, S. Tingry (Electrochemistry Communications 9 331-336 2007). In this example of biofuel cell, at the cathode, the oxygen is reduced into water by the laccase enzyme in the presence of mediator 2,2'-azinobis-(3-ethylbenzo-thiazoline-6-sulfonate) or ABTS. At the anode, the glucose is oxidized into gluconolactone by the glucose oxidase enzyme (GOD) in the presence of mediator 8-hydroxyquinoline-5-sulfonicacidhydrate or HQS.

As an example, calling GODox and GODred, respectively, the oxidized and reduced form of the glucose oxidase enzyme, and Medox and Medred, respectively, the oxidized form and the reduced form of the redox mediator, the following reactions can be observed at the anode:

Glucose+GODox→Gluconolactone+GODred (1)

GODred+Medox→GODox+Medred (2)

Medred→Medox+2e⁻ (3)

reaction (3) reflecting the electron transfer to the anode electrode.

A disadvantage of currently-provided biofuel cells is that a parasitic reaction may occur at the anode, involving dioxygen which reacts with the enzyme and prevents the electron transfer to the anode electrode. In the previous example, the following reaction competes with reaction (2):

GODred+$O_2$→GODox+$H_2O_2$ (4)

so that reaction (3) is short-circuited.

It is then necessary to provide specific devices to prevent the oxygen from reaching the anode, which results in complex systems.

Another disadvantage of currently-provided biofuel cells is that it is necessary to provide an immobilization of the enzymes and of the redox mediator on a surface so that reaction (2) can happen properly. The enzyme activity is thus limited to a surface, which makes it difficult to obtain a biofuel cell of high efficiency.

FIELD OF THE INVENTION

The present invention provides a biofuel cell where the reactions implemented during the biofuel cell operation are not disturbed by the presence of dioxygen.

According to another object of the present invention, the biofuel cell can be easily implanted in a human body.

According to another object of the present invention, the biofuel cell can be obtained with a wide range of redox couples.

According to another object of the present invention, the biofuel cell does not use polluting materials such as platinum, nickel, etc.

Thus, an aspect of the present invention provides a cell comprising first and second chambers containing a solvent and separated by a wall permeable to the solvent. A first electrode is at least partly arranged in the first chamber. A second electrode is at least partly arranged in the second chamber. A first redox couple is placed in the first chamber in contact with the solvent and comprises a first oxidizer and a first reducer taking part in first oxidation-reduction reactions resulting in an electron exchange with the first electrode. A second redox couple is placed in the second chamber in contact with the solvent and comprises a second oxidizer and a second reducer taking part in second oxidation-reduction reactions resulting in an electron exchange with the second electrode. Said wall is impermeable to the first and second redox couples. First enzymes or first microorganisms are placed in the first chamber or in the second chamber and promote third oxidation-reduction reactions different from the first and second oxidation-reduction reactions resulting in the transformation of a first substance to provide a second substance in the solvent of the first and/or second chamber, which results in a potential difference between the redox potentials of the first and second redox couples or a maintaining of the concentrations of the first and second oxidizers and reducers.

According to an embodiment, the wall prevents or at least slows down the passing of hydronium and/or hydroxyl ions, the cell comprising a first device for varying the pH in the first chamber, the first enzymes or the first microorganisms being capable of transforming the first substance to provide in the solvent of the first chamber hydronium or hydroxyl ions, which results in a potential difference between the redox potentials of the first and second redox couples.

According to an embodiment, the first oxidizer is a quinone and the first reducer is a reduced form of said quinone.

According to an embodiment, the first substance is D-glucose and the first enzymes are glucose oxidase enzymes capable of causing the production of hydronium ions by oxidation of the D-glucose.

According to an embodiment, the first substance is L-glucose and the first enzymes are L-fucose dehydrogenase enzymes capable of causing the production of hydronium ions by oxidation of the L-glucose.

According to an embodiment, the first substance is urea and the first enzymes are urease enzymes capable of causing the production of hydroxyl ions by degradation of the urea.

According to an embodiment, the first and second redox couples are identical.

According to an embodiment, the first chamber comprises a membrane permeable to the solvent, non-permeable to the first enzymes or to the first microorganisms, and delimiting a solvent volume in which the first electrode is plunged, the first redox couple being dissolved in said volume, the first enzymes or the first microorganisms being placed outside of said volume.

According to an embodiment, the first redox couple is placed at the level of a solid or gel phase at least partially surrounding the first electrode.

According to an embodiment, the first device for varying the pH in the first chamber comprises the first enzymes or the first microorganisms capable of transforming the first substance to provide hydronium ions in the solvent of the first chamber. The cell comprises a second device for varying the pH in the second chamber comprising second enzymes or second microorganisms capable of transforming a third substance to provide hydroxyl ions in the solvent of the second chamber.

According to an embodiment, the cell comprises a third device for varying the pH in the first chamber comprising third enzymes or third microorganisms, possibly identical to the second enzymes or to the second microorganisms, capable of transforming a fourth substance, possibly identical to the third substance, to provide hydroxyl ions in the solvent of the first chamber. The cell further comprises a fourth device for varying the pH in the second chamber comprising fourth enzymes or fourth microorganisms, possibly identical to the first enzymes or to the first microorganisms, capable of transforming a fifth substance, possibly identical to the first substance, to provide hydronium ions in the solvent of the second chamber. The cell further comprises a device capable of actuating the first and second devices while blocking the third and fourth devices and of actuating the third and fourth devices while blocking the first and second devices.

According to an embodiment, the cell comprises a device for regenerating the first oxidizer or the first reducer comprising fifth enzymes or fifth microorganisms capable, in the case where the first reactions comprise the reduction of the first oxidizer into the first reducer, of transforming the first reducer into the first oxidizer and, in the case where the first reactions comprise the oxidation of the first reducer into the first oxidizer, of transforming the first oxidizer into the first reducer.

According to an embodiment, the fifth enzymes are tyrosinase- or peroxidase-type enzymes capable of promoting the oxidation of the reduced form of said quinone into said quinone with a consumption of dioxygen or of hydrogen peroxide.

According to an embodiment, the cell comprises a pathway connecting the first chamber to the second chamber, the pathway being provided with a valve that can be controlled to be opened.

According to an embodiment, the cell comprises sixth enzymes or sixth microorganisms capable, in the case where the first reactions comprise the reduction of the first oxidizer into the first reducer, of transforming the first reducer into the first oxidizer with a consumption of the second substance and, in the case where the first reactions comprise the oxidation of the first reducer into the first oxidizer, of transforming the first oxidizer into the first reducer with a consumption of the second substance. According to an embodiment, the first oxidizer is ubiquinone and the first reducer is ubiquinol, the first substance being glucose and the second substance being hydrogen peroxide. The first enzymes are glucose oxidase enzymes capable of causing the production of hydrogen peroxide from glucose. The second oxidizer is a quinone and the second reducer is a reduced form of said quinone. The sixth enzymes correspond to peroxidase enzymes capable of oxidizing the reduced form of said quinone into said quinone with a consumption of hydrogen peroxide.

According to an embodiment, the first oxidizer is dehydroascorbate and the first reducer is ascorbate, the first substance being glucose and the second substance being hydrogen peroxide. The first enzymes are glucose oxidase enzymes capable of causing the production of hydrogen peroxide from glucose. The second oxidizer is a quinone and the second reducer is a reduced form of said quinone. The sixth enzymes correspond to peroxidase enzymes capable of oxidizing the reduced form of said quinone into said quinone with a consumption of hydrogen peroxide.

BRIEF DESCRIPTION OF THE DRAWINGS

The foregoing and other objects, features, and advantages of the present invention will be discussed in detail in the following non-limiting description of specific embodiments in connection with the accompanying drawings.

DETAILED DESCRIPTION

For clarity, the same elements have been designated with the same reference numerals in the different drawings.

In a conventional biofuel cell, the electrons captured by the anode electrode directly originate from the oxidation of a biodegradable substrate by an enzyme (with a redox mediator possibly standing as an interface with the electrode).

The principle of the biofuel cell according to the present invention is to use the reaction of substrate degradation by the enzyme or by the microorganism, no longer directly to generate the electrons captured by the anode electrode, but rather to promote the creation or the maintaining of a potential difference between the anode and cathode electrodes.

According to an embodiment of a biofuel cell according to the invention, the substrate degradation is used to obtain a pH difference between the anode and the cathode and one or several redox couples having their redox potentials varying according to the pH are used at the anode and/or at the cathode. In particular, the same redox couple may be used at the anode and at the cathode. The pH variation between the anode and the cathode of the biofuel cell results in a potential difference between the electrodes of the biofuel cell.

According to another embodiment of a biofuel cell according to the invention, one or several redox couples having their redox potentials varying according to the concentrations of the oxidizer and of the reducer of the redox couple in the solution are used at the anode and/or at the cathode. The reaction of substrate degradation by the enzyme or the microorganism is then used to promote, for at least one redox couple, the maintaining of a strong difference between the concentration of the oxidizer and the concentration of the reducer of the couple to obtain a potential difference between the electrodes of the biofuel cell.

According to another embodiment of a biofuel cell according to the invention, different redox couples are used at the anode and at the cathode so that a potential difference is normally present between the cathode and anode electrodes. The reaction of substrate degradation by the enzyme or the microorganism is then used to promote the regeneration of the species of the redox couples to ensure the durability of the oxidation-reduction reactions at the anode and at the cathode.

The three previously-described embodiments of a biofuel cell may be combined, the reaction of substrate degradation by the enzyme or by the microorganism being simultaneously used to promote the creation of a pH between the anode and the cathode and/or the creation of a difference between the concentrations of the oxidizer and of the reducer of the redox couple at the anode and/or at the cathode and/or the regeneration of the species of the redox couples.

The fuel cell according to the present invention is a biofuel cell in that the potential differences between the anode and cathode electrodes involves a reaction implying the degradation of a substrate by an enzyme or a microorganism. Further, since the reaction of substrate degradation by the enzyme or the microorganism is no longer used to directly provide the electrons captured by the anode electrode, it is no longer necessary to isolate the anode from the dioxygen. This enables to simplify the forming of the biofuel cell. Further, given that there is no connection between the enzyme, or the microorganism, and the redox couple taking part in the generation of electrons captured at the anode electrode, there is more freedom for the choice of the redox couple. Moreover, in a conventional biofuel cell, it is necessary to immobilize the enzymes and the mediators so that the reactions which result in the generation of electrons take place properly. The enzymes activity is thus limited to a surface. In the embodiments of biofuel cells according to the present invention, the enzymes or the microorganisms do not directly take part in the electron generation and they can be dispersed in a solution. The activity of the enzymes or of the microorganisms then extends throughout a volume and is no longer limited to a surface, which enables to improve the efficiency of the biofuel cell.

Embodiments of biofuel cells according to the invention will now be described in the case where redox couples having their redox potentials varying according to the pH.

Call $Ox_1/Red_1$ the redox couple used at the biofuel cell cathode. Redox potential $E_1$ of couple $Ox_1/Red_1$ varies according to the pH at the cathode, called $pH_1$. The electronic half-reaction associated with redox couple $Ox_1/Red_1$ is the following:

$$Ox_1 + ne^- + qH^+ = Red_1 + \frac{q}{2}H_2O \quad (5)$$

where n and q are integers. Redox potential $E_1$ of couple $Ox_1/Red_1$, provided by the Nernst law, can be written as follows:

$$E_1 = E_1^\circ - \frac{q \cdot R \cdot T \cdot \ln 10}{n \cdot F} pH_1 + \frac{R \cdot T \cdot \ln 10}{n \cdot F} \log\left(\frac{[Ox_1]}{[Red_1]}\right) \quad (6)$$

where $E_1^\circ$ is the standard potential of redox couple $Ox_1/Red_1$, R is the perfect gas constant, F is Faraday's number, and T is the absolute temperature.

Call $Ox_2/Red_2$ the redox couple used at the biofuel cell anode. Redox potential $E_2$ of couple $Ox_2/Red_2$ varies according to the pH at the anode, called $pH_2$. The electronic half-reaction associated with redox couple $Ox_2/Red_2$ is the following:

$$Ox_2 + n'e^- + q'H^+ = Red_2 + \frac{q'}{2}H_2O \quad (7)$$

where n' and q' are integers. Redox potential $E_2$ of couple $Ox_2/Red_2$, provided by the Nernst law, can be written as follows:

$$E_2 = E_2^\circ - \frac{q' \cdot R \cdot T \cdot \ln 10}{n' \cdot F} pH_2 + \frac{R \cdot T \cdot \ln 10}{n' \cdot F} \log\left(\frac{[Ox_2]}{[Red_2]}\right) \quad (8)$$

where $E_2^\circ$ is the standard potential of redox couple $Ox_2/Red_2$.

Potential difference $\Delta E$ between the electrodes of the biofuel cell is equal to:

$$\begin{aligned}\Delta E &= E_1 - E_2 \\ &= E_1^\circ - E_2^\circ - \frac{R \cdot T \cdot \ln 10}{F} \\ &\quad \left(\frac{q}{n}pH_1 - \frac{q'}{n'}pH_2 - \frac{1}{n}\log\left(\frac{[Ox_1]}{[Red_1]}\right) - \frac{1}{n'}\log\left(\frac{[Red_2]}{[Ox_2]}\right)\right)\end{aligned} \quad (9)$$

In the case where integers n, q, n', and q' are equal to one, and considering that the concentrations are initially equal and vary little, relation (9) becomes:

$$\Delta E = E_1^\circ - E_2^\circ - \frac{R \cdot T \cdot \ln 10}{F}\left(pH_1 - pH_2 - \log\left(\frac{[Ox_1][Red_2]}{[Red_1][Ox_2]}\right)\right) \quad (10)$$

The present invention provides to promote at least in one of the chambers a first series of chemical reactions involving enzymes or microorganisms and causing a decrease of the pH in the solution in the chamber or a second series of chemical reactions involving enzymes or microorganisms and causing an increase in the pH of the solution in the chamber. The biofuel cell further comprises a device which, while creating a salt bridge between the anode and the cathode of the biofuel cell, prevents or reduces the transfer of $H^+$ or $OH^-$ ions between the anode and the cathode to maintain a pH difference between the anode and the cathode.

Any reaction resulting in the forming of $H^+$ ions, and thus in a pH decrease, is suitable for the first series of reactions. Such is the case, in particular, for the oxidation of D-glucose, or D stereoisomer of glucose, by the glucose oxidase enzyme (GOD), which results in the forming of gluconic acid (capable of releasing an $H^+$ ion) and of hydrogen peroxide. Hydrogen peroxide, which may be toxic, may if need be degraded by the catalase enzyme, which will enable to regenerate dioxygen, thus protecting the organism against the potentially toxic effects of hydrogen peroxide. The involved reactions are the following:

(11)

$$\text{D-glucose} + O_2 \xrightarrow{\text{glucose oxidase}} \text{D-gluconic acid} + H_2O_2$$

$$\text{D-gluconic acid} \longrightarrow \text{D-gluconate} + H^+$$

$$H_2O_2 \xrightarrow{\text{catalase}} \tfrac{1}{2}O_2 + H_2O$$

The first series of reactions may correspond to the oxidation of L-glucose, or L stereoisomer of glucose, by the L-fucose dehydrogenase enzyme. The involved reactions are the following:

(12)

where the NADP compound corresponds to Nicotinamide Adenine Dinucleotide Phosphate and where NADPH corresponds to the same compound once reduced.

The second series of reactions implemented by the present invention to basify a solution may correspond to the degradation of urea by the urease enzyme which results in the forming of ammonium ions $NH_4^+$ and of hydroxyl ions $OH^-$. The involved reactions are the following:

(13)

Reactions (11) and (13) have the advantage of being directly implementable with a biological solution which naturally contains D-glucose, which is the glucose taking part in glycemia, and urea. Reactions (12) may easily be implemented with a biological solution which naturally contains the NADP compound. L-glucose then just has to be added to the biological solution.

Figure 1:
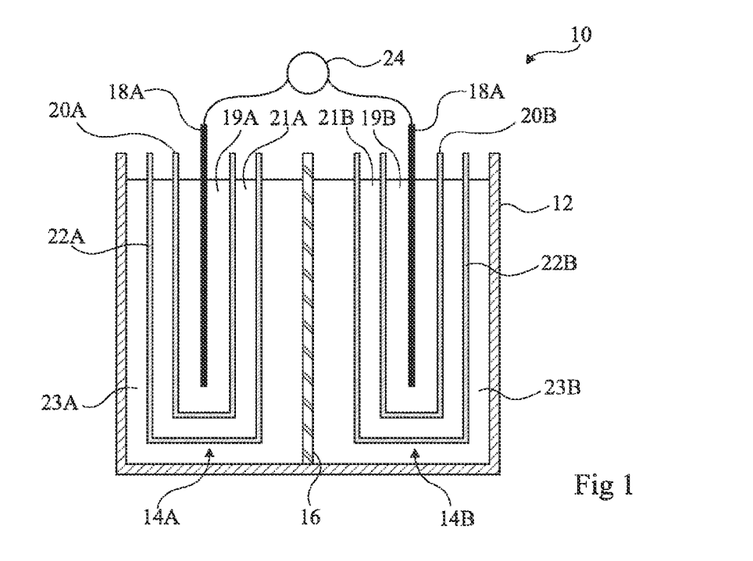
FIGS. 1 to 6 schematically show embodiments of a biofuel cell according to the invention.

FIG. 1 schematically shows an embodiment of a biofuel cell 10 according to the invention. Biofuel cell 10 comprises an enclosure 12, in which two chambers 14A, 14B separated by a membrane 16 having a function which will be described in further detail hereafter are delimited. In the present embodiment, it is considered that, at least during an operating phase of biofuel cell 10, the electric power delivered by biofuel cell 10 originates from a reduction reaction taking place in chamber 14A and from an oxidation reaction taking place in chamber 14B so that chamber 14A is called a cathode chamber and chamber 14B is called an anode chamber. Anode and cathode chambers 14A, 14B of the biofuel cell are at least partly symmetrical to each other and the same reference numerals are used to designate identical elements of the chambers, with suffix A for an element of cathode chamber 14A and with suffix B for an element of anode chamber 14B.

Each chamber 14A, 14B comprises an electrode 18A, 18B formed of a material which is a good electronic conductor, for example, a metal, a metal alloy, carbon, a conductive polymer, a semiconductor material, or a mixture of these materials. Each electrode 18A, 18B is plunged in a first solution 19A, 19B having its volume delimited by a semi-permeable membrane 20A, 20B. Membrane 20A, 20B is plunged in a second solution 21A, 21B having its volume delimited by membrane 20A, 20B and by a semipermeable membrane 22A, 22B. Membrane 22A, 22B is plunged into a solution 23A, 23B having its volume delimited by membrane 22A, 22B, enclosure 12, and membrane 16. Electrodes 18A, 18B are connected to a load 24.

Redox couple $Ox_1/Red_1$ is dissolved in solution 19A and couple $Ox_2/Red_2$ is dissolved in solution 19B. In the present embodiment, redox couples $Ox_1/Red_1$ and $Ox_2/Red_2$ are identical. It for example is the redox couple having hydroquinone or benzene-1,4-diol, of molecular formula C6H4 (OH)2, as reducer Red1, and having its oxidizer Ox1 corresponding to the oxidized form of hydroquinone. More specifically, oxidizer $Ox_1$ has molecular formula $C_6H_4O_2$ and corresponds to cyclohexa-2,5-diene-1,4-dione, also called 1,4-cyclohexadienedione, 1,4-benzoquinone, p-benzoquinone, or parabenzoquinone. In the following description, term benzoquinone will be used to designate cyclohexa-2,5-diene-1,4-dione.

In cathode chamber 14A, the electronic half-reaction of reduction of benzoquinone into hydroquinone, promoted in solution 19A, is the following:

(14)

In solution 21A, previously-described reactions (11) or (12) are privileged. As an example, GOD enzymes are placed in solution 21A. Membranes 20A and 22A are selected to prevent the migration of GOD enzymes. To limit the diffusion of redox couple $Ox_1/Red_1$, membrane 20A may be selected to prevent the migration of benzoquinone or hydroquinone. Further, membrane 22A is selected to be permeable to glucose and gluconate.

Membranes 20A, 22A may be dialysis membranes. The cut-off threshold of membrane 20A may then be of approximately 100 Daltons and the cut-off threshold of membrane 22A may approximately range from 4,000 to 60,000 Daltons. Membrane 20A or membrane 22A may correspond to a loaded membrane.

It may be desirable to suppress membrane 20A, especially when redox couple $Ox_1/Red_1$ has no inhibiting effect on GOD enzymes. In this case, it is advantageous to use a redox couple $Ox_1/Red_1$ corresponding to molecules having a greater molecular weight than the benzoquinone/hydroquinone couple so that, when membrane 22A is a dialysis membrane, the threshold of membrane 22A is sufficiently low to retain redox couple $Ox_1/Red_1$ and sufficiently high to enable the migration of glucose and of gluconate.

In anode chamber 14B, the electronic half-reaction of oxidation of hydroquinone, promoted in solution 19B, is the following:

(15)

In solution 21B, reactions (13) are privileged. As an example, urease enzymes are placed in solution 21B. Since benzoquinone and hydroquinone tend to inhibit urease enzymes, membrane 20B is selected to prevent the migration of urease enzymes, benzoquinone, and hydroquinone. Further, membrane 22B is selected to prevent the passing of urease enzymes and to let through urea, ammonium ions $NH_4^+$, and hydroxyl ions $OH^-$.

As an example, membranes 20B and 22B correspond to dialysis membranes. In this case, the cut-off threshold of membrane 20B may be of approximately 100 Daltons and the cut-off threshold of membrane 22B may approximately range from 4000 to 60,000 Daltons. Membrane 20B or membrane 22B may correspond to a loaded membrane.

Membranes 16, 20A, 22A, 20B, 22B are permeable to the solvent forming solutions 19A, 19B, 21A, 21B, 23A, 23B. Membrane 16 is capable of ensuring the ionic equilibrium between chambers 14A et 14B. It for example is a membrane formed of organic or inorganic gel or hydrogel, of a lipidic membrane associated with a transmembrane protein, with an ionic conductive polymer, etc. As an example, membrane 16 corresponds to a gel membrane such as Agar-Agar or Agarose loaded with potassium chloride (KCl). Such a membrane 16 prevents or at least strongly reduces the migration of $H^+$ ions from cathode chamber 14A to anode chamber 14B and of hydroxyl ions $OH^-$ from anode chamber 14B to cathode chamber 14A. Such a membrane 16 is loaded with $K^+$ and $Cl^-$ ions to enable the releasing of $K^+$ ions into anode chamber 14B and of $Cl^-$ ions into cathode chamber 14A to ensure the general ionic equilibrium of the solutions. Membrane 16 ensures the maintaining of the pH difference between chambers 14A and 14B by limiting the transfer of $H^+$ and $OH^-$ ions from one chamber 14A, 14B to the other.

Means, not shown, enable to supply solution 23A with glucose and solution 23B with urea. For this purpose, enclosure 12 may be plunged into a solution containing glucose and urea, for example, a biological solution. One or several valves may then be provided at the level of enclosure 12 to enable, when they are open, to have solutions 23A, 23B communicate with the outside. As an example, enclosure 12 may be totally formed of a semipermeable membrane having a sufficiently high cut-off threshold to let through glucose and urea.

Generally, the shape of electrodes 18A, 18B is adapted to ensure as efficient an electron exchange as possible with redox couples $Ox_1/Red_1$ and $Ox_2/Red_2$. As an example, electrodes 18A, 18B may be grid-shaped.

Biofuel cell 10 operates as follows. Initially, solutions 19A and 19B may comprise identical benzoquinone and hydroquinone concentrations, for example in the form of benzoquinone/hydroquinone complexes. Initially, the pHs of solutions 19A, 19B are substantially identical, for example, on the order of 7. The redox potentials of the benzoquinone/hydroquinone couple in cathode chamber 14A and in anode chamber 14B are thus initially substantially equal. Glucose is introduced into solution 23A and urea is introduced into solution 23B. The glucose degradation reaction in solution 21A results in a decrease of the pH in solution 21A, then in solution 19A surrounded by solution 21A. The pH decrease in solution 19A translates as an increase in the redox potential of the benzoquinone/hydroquinone couple in cathode chamber 14A. At the same time, the urea degradation reaction in solution 21B results in a pH increase in solution 21B, then in solution 19B surrounded by solution 21B. The pH increase in solution 19B translates as a decrease in the redox potential of the benzoquinone/hydroquinone couple in cathode chamber 14B. A potential difference between electrodes 18B and 18A provided by relation (9) is obtained. Electronic half-reaction (14) thus takes place in cathode chamber 14A and electronic half-reaction (15) takes place in anode chamber 14B.

The Applicant has obtained a biofuel cell 10 providing a 10.2-μW power, with a 2,4-μW/cm² surface power for a potential difference ΔE of 0.30 V.

According to a variation, an additional membrane surrounding membrane 20A and corresponding to a loaded membrane made with the material known as Nafion may be provided. Such a membrane enables to prevent the migration of anions, for example, bicarbonate anions $HCO_3^-$, while it lets through cations and glucose. This enables to avoid a pH variation in solution 19A due to anions present in the glucose supply solution, for example, a biological solution. An additional membrane surrounding membrane 20B and corresponding to a loaded membrane preventing cations from crossing and letting through anions may be provided. This enables to avoid a variation of the pH in solution 19B due to cations present in the urea supply solution, for example, a biological solution.

Redox couples other than the benzoquinone/hydroquinone couples may be used. For example, a redox couple having a quinone as its oxidizer and having a reduced form of said quinone as its reducer may be used. Further, in the previously-described embodiment, the same redox couple is used in the anode chamber and in the cathode chamber. However, a first redox couple may be used in the anode chamber and a second redox couple, different from the first couple, may be used in the cathode chamber. In this case, initially, when the pHs of chambers 14A, 14B are identical, the redox potentials of the couples in chambers 14A and 14B may be different according to equation (9). The pH difference due to the action of the enzymes in chambers 14A, 14B can then be used to further increase the potential difference between chambers 14A and 14B.

In the previously-described embodiment, the pH has been varied both in cathode chamber 14A and in anode chamber 14B. However, independently from the fact that the same redox couple or different redox couples are used in chambers 14A and 14B, a pH variation in a single one of chambers 14A, 14B may be sufficient to obtain a proper difference between the redox potential of the redox couple present in cathode chamber 14A and the redox potential of the redox couple present in anode chamber 14B. As an example, as compared with the previously-described embodiment, only glucose oxidase enzymes GOD may be placed in solution 21A, while doing without urease enzymes and possibly suppressing membrane 22B. Solution 19B may have a pH which is substantially neutral or slightly alkaline if it is a biological solution. Indeed, the pH decrease in solution 19A due to the oxidation of glucose by the GOD enzyme causes an increase in the redox potential of the benzoquinone/hydroquinone redox couple in solution 19A with respect to the redox potential of the benzoquinone/hydroquinone redox couple in solution 19B, which enables to establish half-reaction (14) in cathode chamber 14A and half-reaction (15) in a anode chamber 14B. According to another example, only urease enzymes are placed in solution 21B, while there are no GOD enzymes and membrane 21A is suppressed. Indeed, the pH increase in solution 19B due to the degradation of urea by the urease enzyme causes a decrease in the redox potential of the benzoquinone/hydroquinone redox couple in solution 19B with respect to the redox potential of the benzoquinone/hydroquinone redox couple in solution 19A, which enables to establish half-reaction (14) in cathode chamber 14A and half-reaction (15) in anode chamber 14B.

During the previously-described operation of biofuel cell 10, hydroquinone is produced by consuming benzoquinone in cathode chamber 14A and benzoquinone is produced by consuming hydroquinone in anode chamber 14B. Reactions (14) and (15) will thus be interrupted when the benzoquinone concentration will be too low in cathode chamber 14A and the hydroquinone concentration will be too low in anode chamber 14B. Several possibilities may be provided to avoid the operation of fuel cell 10 from stopping.

According to an embodiment of a biofuel cell enabling to renew the chemical species in chambers 14A, 14B, the biofuel cell comprises means for discharging and supplying benzoquinone from and into cathode chamber 14A and hydroquinone from and into anode chamber 14B so that reaction (14) carries on in cathode chamber 14A and reaction (15) carries on in anode chamber 14B.

According to another embodiment of a biofuel cell enabling to renew the chemical species in chambers 14A, 14B, the redox couples present in chambers 14A and 14B are selected to be reversible, which is the case for the benzoquinone/hydroquinone couple. The assembly formed by membrane 20A, solution 19A, and electrode 18A may be removed from solution 21A and arranged in solution 21B.

Further, the assembly formed by membrane 20B, solution 19B, and electrode 18B may be removed from solution 21B and arranged in solution 21A. The exchange is performed as soon as reactions (14) and (15) tend to stop. Once the exchange has been performed and the pHs have settled down, reactions (14) and (15) can carry on since the hydroquinone has been renewed in anode chamber 14B and the benzoquinone has been renewed in cathode chamber 14A.

According to another embodiment of a biofuel cell enabling to renew the chemical species in chambers 14A, 14B, the redox couples present in chambers 14A and 14B are selected to be reversible. When reactions (14) and (15) tend to stop, electrodes 18A, 18B are connected to a sufficient power source to force, in chambers 14A, 14B, the half-reactions inverse to half-reactions (14) and (15), that is, to promote, in anode chamber 14B the reduction of quinone into hydroquinone, and to promote, in cathode chamber 14A, the oxidation of hydroquinone into benzoquinone.

Figure 2:
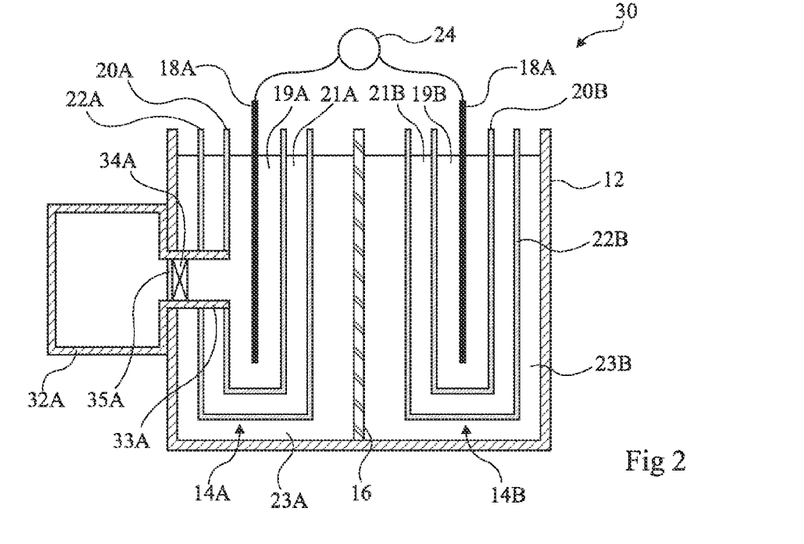

FIG. 2 shows another embodiment of a biofuel cell 30 enabling to renew the chemical species in chambers 14A, 14B when the redox couples present in chambers 14A and 14B are reversible couples. Biofuel cell 30 comprises a secondary enclosure 32A which communicates with solution 19A through an opening 33A. A valve 34A, when opened, puts the content of secondary enclosure 32A in communication with solution 19A. A semipermeable membrane 35A separates the content of secondary enclosure 32A from solution 19A. Secondary enclosure 32A comprises one or several enzymes capable of producing benzoquinone from the hydroquinone. Membrane 35A is selected to prevent the migration of the enzymes contained in enclosure 32A and to let through benzoquinone and hydroquinone.

As an example, the enzyme present in secondary enclosure 32A is a tyrosinase of polyphenol oxidase type, which promotes the following reaction:

(16)

According to another example, the enzyme is a peroxidase which promotes, in the presence of hydrogen peroxide, the following reaction:

(17)

Biofuel cell 30 operates as follows. In normal operation, valve 34A is closed and the operation of biofuel cell 30 is identical to what has been previously described in relation with biofuel cell 10. When the benzoquinone concentration in cathode chamber 14A has to be increased, valve 34A is opened. Hydroquinone then penetrates into secondary enclosure 32A where it is transformed into benzoquinone under the action of the enzymes present in enclosure 32A. When the benzoquinone concentration is sufficient, valve 34A is closed.

The hydroquinone renewal in anode chamber 24B may be performed by addition of hydroquinone in solution 19B.

Figure 3:
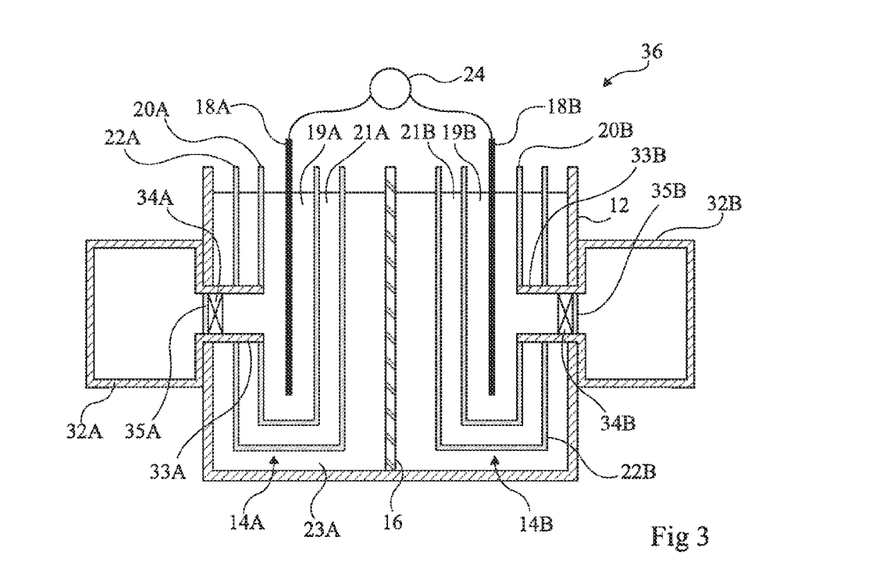

FIG. 3 shows another embodiment of a biofuel cell 36 enabling to renew the chemical species in chambers 14A, 14B when the redox couples present in chambers 14A and 14B are reversible couples. Biofuel cell 36 comprises all the elements of biofuel cell 30 and further comprises, at the level of anode chamber 14B, a secondary enclosure 32B similar to secondary enclosure 32A.

Secondary enclosure 32B comprises one or several enzymes capable of producing hydroquinone from the hydroquinone. Membrane 35B is selected to prevent the migration of the enzymes contained in enclosure 32B and to let through benzoquinone and hydroquinone.

As an example, the enzyme present in secondary enclosure 32B is a diaphorase, which promotes the following reaction:

(18)

Biofuel cell 36 then comprises means for supplying the NADPH compound into secondary enclosure 32B. It may be advantageous to provide to supply the NADPH compound into secondary enclosure 32B rather than to supply hydroquinone into solution 19B since this enables to maintain the benzoquinone and hydroquinone concentrations within limited ranges.

According to another example, the enzyme present in secondary enclosure 32B is a para-benzoquinone reductase which promotes a reaction identical to reaction (18).

According to another example, the enzyme present in secondary enclosure 32B is an L-malate dehydrogenase, which promotes the following reaction:

(19)

The operation of biofuel cell 36 will now be described. In normal operation, valves 34A and 34B are closed and the operation of biofuel cell 36 is identical to what has been previously described in relation with biofuel cell 10. When the benzoquinone concentration in cathode chamber 14A must be increased and the hydroquinone concentration in anode chamber 14B must be increased, valves 34A and 34B are opened. Hydroquinone then penetrates into secondary enclosure 32A where it is transformed into benzoquinone under the action of the enzymes present in enclosure 32A and benzoquinone then penetrates into secondary enclosure 32B where it is transformed into hydroquinone under the action of the enzymes present in enclosure 32B. When the benzoquinone and hydroquinone concentrations are sufficient, valves 34A and 34B are closed.

According to a variation of biofuel cell 36, only secondary enclosure 32B may be present. The renewal of the benzoquinone in cathode chamber 14A can then be carried out by supplying benzoquinone into solution 19A.

Figure 4:
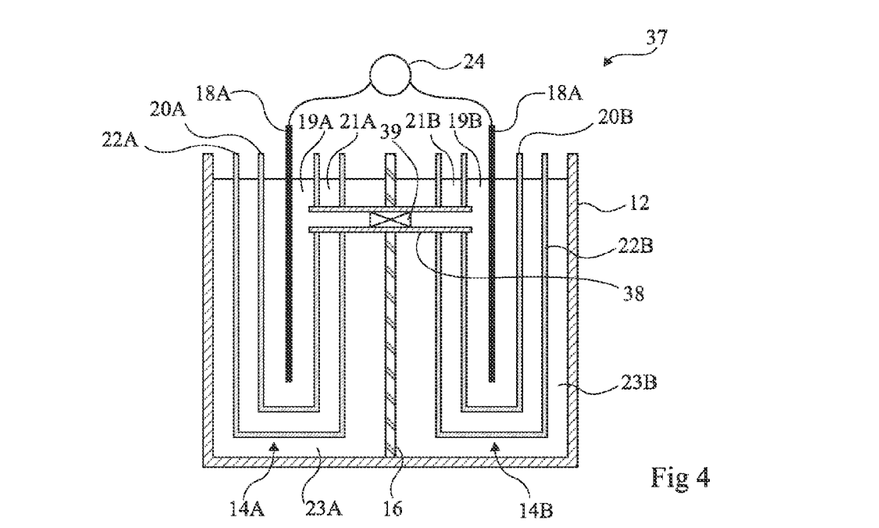

FIG. 4 shows another embodiment of a biofuel cell 37 enabling to renew the chemical species in chambers 14A, 14B when the redox couples present in chambers 14A and 14B are reversible couples. Biofuel cell 37 comprises all the elements of biofuel cell 10 and further comprises a tight duct 38 which emerges at one end into solution 19A and which emerges at the opposite end into solution 19B. A valve 39 is provided in duct 38. The means for controlling valve 39 are not shown.

The operation of biofuel cell 37 will now be described. In normal operation, valve 39 is closed and the operation of biofuel cell 37 is identical to what has been previously described in relation with biofuel cell 10. When the benzoquinone concentration in cathode chamber 14A must be increased and the hydroquinone concentration in anode chamber 14B must be increased, valve 39 is opened. Hydroquinone then propagates from solution 19A to solution 19B and benzoquinone propagates from solution 19B to solution 19A. When the hydroquinone and benzoquinone concentrations are substantially equal in each solution 19A and 19B, valve 39 is closed.

Figure 5:
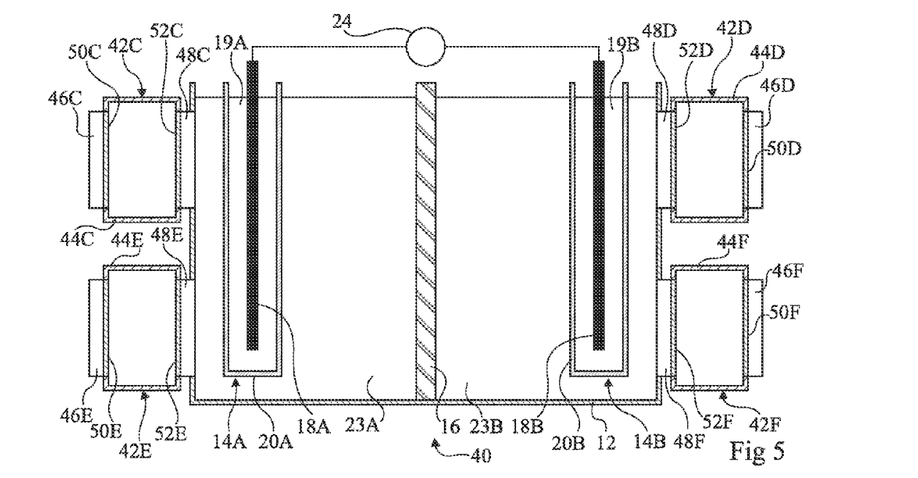

FIG. 5 shows another embodiment of a biofuel cell 40 enabling to renew the chemical species in chambers 14A, 14B when the redox couples present in chambers 14A and 14B are reversible couples. Biofuel cell 40 comprises the same elements as biofuel cell 10 shown in FIG. 1, except for membranes 22A and 22B. Further, biofuel cell 40 comprises four pH variation devices 42C, 42D, 42E, and 42F. In the following description, suffixes "C", "D", "E", and "F" are added to designate elements respectively associated with pH variation devices 42C, 42D, 42E, and 42F. Only pH variation device 42C will be described. Device 42C comprises a tight enclosure 44C and a valve 46C which, when opened, puts the content of enclosure 44C in communication with the outer medium. Device 42C comprises a valve 48C, which, when opened, puts the content of secondary enclosure 44C in communication with solution 23A. Device 42C comprises a membrane 50C arranged between valve 46C and the content of enclosure 44C and a membrane 52C arranged between valve 48C and the content of enclosure 44C. pH variation devices 42D, 42E, and 42F have structures similar to those of pH variation device 42C, valve 48E of device 42E emerging at the level of chamber 14A and valves 48D and 48F of devices 42D and 42F emerging at the level of chamber 14B.

Devices 42C and 42D are of the type enabling to decrease the pH of the solution that they contain. As an example, devices 42C and 42F enable to acidify the solution contained in the associated enclosure 44C, 44F according to previously-described reactions (11). Devices 42E and 42F are of the type enabling to increase the pH of the solution that they contain. As an example, devices 42E and 42F enable to alkalize the solution contained in the associated enclosure 44E, 44F according to previously-described reactions (13).

An example of operation of cell 40 is the following. During the cycle of openings of valves 48C to 48F which will now be described, valves 46C to 46F of devices 42C to 42F are controlled to supply enclosures 44C to 44F with glucose and/or with urea so that enclosures 44C to 44F contain solutions having the desired pH. Initially, solutions 19A and 19B have the same pH. In a first operating phase, valve 48C is opened, valve 48D is closed, valve 48E is closed, and valve 48F is opened. $H^+$ ions are then released into chamber 14A by device 42C, causing a decrease in the pH of solution 19A, and $OH^-$ ions are released by device 42F, causing an increase in the pH of solution 19B. The pH decrease of solution 19A translates as an increase in the redox potential of the redox couple present in chamber 14A and the pH increase of solution 19B translates as a decrease in the redox potential of the redox couple present in chamber 14B. The previously-described reduction reaction (14) takes place in chamber 14A and the previously-described oxidation reaction (15) takes place in chamber 14B. An electron transfer from electrode 18B, which plays the role of the anode electrode, to electrode 18A, which plays the role of the cathode electrode, can thus be observed through load 24.

In a second operating phase, valve 48C is closed, valve 48D is opened, valve 48E is opened, and valve 48F is closed. $H^+$ ions are then released by device 42D, thus decreasing the pH of solution 19B. Simultaneously, $OH^-$ ions are released by device 42E, thus increasing the pH of solution 19A. The pH decrease of solution 19B translates as an increase in the redox potential of the redox couple present in chamber 14B and the increase of the pH of solution 19A translates as a decrease in the redox potential of the redox couple present in chamber 14A. The previously-described reduction reaction (14) takes place in chamber 14B and the previously-described oxidation reaction (15) takes place in chamber 14A. An electron transfer from electrode 18A, which plays the role of the anode electrode, to electrode 18B, which plays the role of the cathode electrode, can thus be observed through load 24. The poles of biofuel cell 40 are thus inverted in the second phase with respect to the first phase. The first and second phases may be cyclically alternated.

Figure 6:
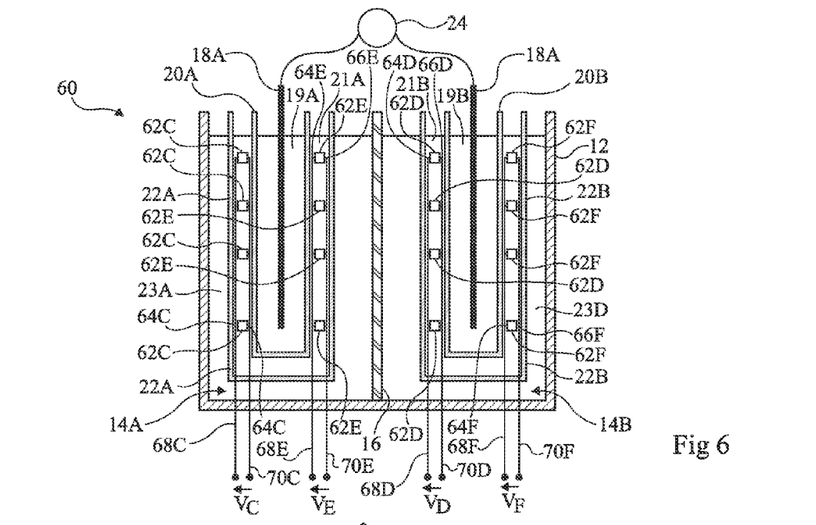

FIG. 6 shows another embodiment of a biofuel cell 60 enabling to renew the chemical species in chambers 14A, 14B when the redox couples present in chambers 14A and 14B are reversible couples. Biofuel cell 60 may have the same arrangement of membranes 20A, 20B, 22A, 22B as biofuel cell 10. Enzymes promoting reactions causing a pH decrease, for example, previously-described reactions (11) or (12), are contained in tanks 62C arranged in solution 21A and in tanks 62D arranged in solution 21B. Enzymes promoting reactions causing a pH increase, for example, previously-described reaction (13), are contained in tanks 62E arranged in solution 21A and in tanks 62F arranged in solution 21B.

Each tank 62C to 62F may switch from a first so-called "closed" configuration, where the tank is substantially tight, that is, the content of tank 62C to 62F does not communicate, or only slightly, with solution 21A, 21B, to a second so-called "open" configuration, where the content of the tank communicates with solution 21A, 21B. The opening and the closing of tanks 62C to 62F may be electrically controlled. As an example, each tank 62C to 62F comprises two control terminals 64C to 64F and 66C to 66F and may change configuration according to the voltage applied between the associated control terminals 64C to 64F and 66C to 66F. Tanks 62C to 62F are assembled in parallel between two tracks 68C to 68F and 70C to 70F. A voltage $V_C$ to $V_F$ is applied between tracks 68C to 68F and 70C to 70F to control the opening or the closing of the associated tanks 62C to 62F.

Figure 7:
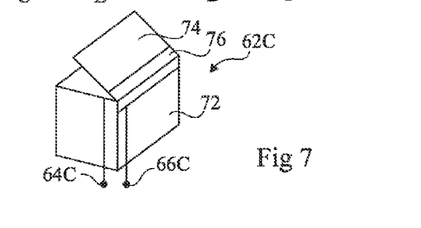
FIG. 7 schematically shows an embodiment of a specific element of the biofuel cell of FIG. 4.

FIG. 7 schematically shows an embodiment of one of tanks 62C. Tanks 62D to 62F may have a structure similar to that of tank 62C. Tank 62C has the shape of a box 72 closed by a lid 74 connected to the rest of box 72 by a hinge 76. Hinge 76 is formed of an electroactive material, for example, an electroactive polymer. For example, it may be an electroactive polymer sold by Micromuscle Company. There are several types of electroactive polymers. The electroactive polymer may be of IPMC type (Ionic Polymer Metal Composite) and correspond to a membrane of reticulated polyelectrolyte polymers filled with water, with electrodes being formed on two surfaces thereof. For an IPMC, the application of an electric field between the two electrodes causes an ion displacement inside of the membrane, which changes the solvent distribution close to each electrode, whereby the membrane is deformed. It may also be a conductive polymer (CP), which has the property of easily losing and gaining electrons, by oxidation-reduction reactions, when it is submitted to a voltage. When plunged in a solution containing ions, a conductive polymer will attract/repel some ions for which it is permeable, causing a deformation of the polymer. It may also be a dielectric polymer comprising an elastomer film arranged between two compliant electrodes which, when submitted to an electric field, will attract each other and compress the elastomer. Terminal 64C is connected to a surface of hinge 76 and terminal 66C is connected to the opposite surface. As an example, when no voltage is applied between terminals 64C, 66C, hinge 76 is in a configuration where lid 74 is open. When a sufficient voltage is applied between terminals 64C, 66C, hinge 76 is in a configuration where lid 74 is closed on box 72. Other tank shapes may be provided, the tank shape having to be adapted to obtain an acceptable tightness when the tank is closed.

The operation of biofuel cell 60 is identical to what has been previously described in relation with biofuel cell 40, with tanks 62C, 62D, 62E, and 62F respectively playing the role of device 42C, 42D, 42E, and 42F. An opening (conversely, a closing) of valve 48C to 48F of a device 42C to 42F for biofuel cell 40 corresponds to an opening (conversely, a closing) of tanks 62C to 62F for biofuel cell 60.

Figure 8:
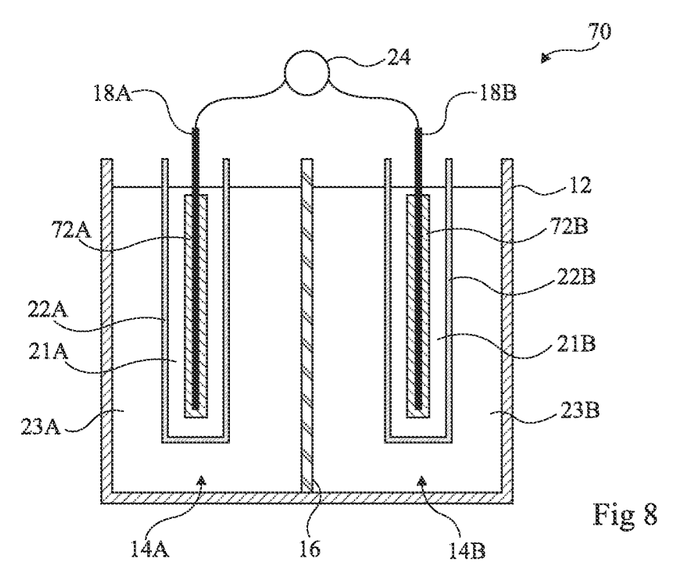
FIGS. 8 to 11 schematically show other embodiments of a biofuel cell according to the invention.

FIG. 8 show another embodiment of a biofuel cell 70. As compared with biofuel cell 10 shown in FIG. 1, redox couple $Ox_1/Red_1$ is arranged at the level of a solid or gel porous phase 72A covering electrode 18A and plunged in solution 21A. Similarly, redox couple $Ox_2/Red_2$ is arranged at the level of a solid or gel porous phase 72B covering electrode 18B and plunged in solution 21B. Membranes 20A and 20B are then no longer present. The fact of immobilizing the redox couples at the level of a solid or gel porous phase enables to decrease the general bulk of biofuel cell 70.

Figure 9:
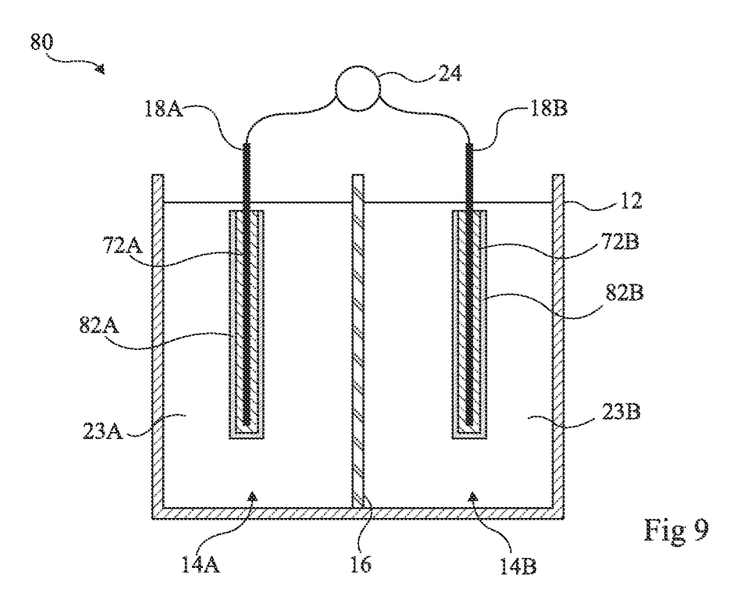

FIG. 9 shows another embodiment of a biofuel cell 80. As compared with biofuel cell 70 shown in FIG. 8, the enzymes taking part in the pH decrease at the cathode are arranged at the level of a solid or gel porous phase 82A covering electrode 72A and plunged in solution 23A. Similarly, the enzymes taking part in the pH increase are arranged at the level of a solid or gel porous phase 82B covering phase 72B and plunged in solution 23B. Membranes 22A and 22B are then no longer present. The fact of immobilizing the enzymes taking part in the pH variation at the level of solid or gel porous phases enables to decrease the general bulk of biofuel cell 80. This further enables to bring the volume in which the pH variation is initiated as close as possible to the volume containing the redox couples having their redox potential varying according to the pH. This enables to improve the cell efficiency.

Embodiments of biofuel cells according to the invention will now be described in the case where the reaction of degradation of a biodegradable substrate by enzymes or microorganisms is used to promote the regeneration of the chemical species of the redox couples and/or to promote the occurrence for at least one of the redox couples of a difference between the concentration of the oxidizer and the concentration of the reducer of the redox couple to vary the redox potential of this redox couple.

Figure 10:
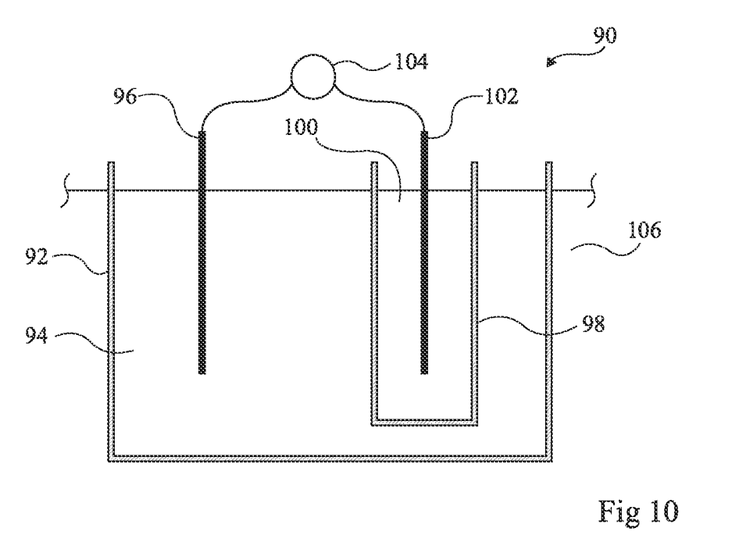

FIG. 10 schematically shows an embodiment of a biofuel cell 90 according to the invention. Biofuel cell 90 comprises a sac 92, formed of a semipermeable membrane and surrounding a content 94, for example, an aqueous solution, an organic solvent, a gel, a paste, a polymer, etc. An electrode 96 is plunged in content 94. Another sac 98, formed of a semipermeable membrane, is placed in content 94. Sac 98 contains a solution 100. An electrode 102 is plunged in solution 100. Electrodes 96, 102 are connected to a load 104. Sac 92 is plunged in a solution 106.

A redox couple $Ox_1/Red_1$ is dissolved in solution 100 and a couple $Ox_2/Red_2$ is dissolved in content 94. In the present embodiment, redox couples $Ox_1/Red_1$ and $Ox_2/Red_2$ are different. As an example, reducer $Red_1$ is hydroquinone, noted $QH_2$, and oxidizer $Ox_1$ corresponds to the oxidized form of hydroquinone, or benzoquinone, noted Q. In solution 100, the reduction of benzoquinone into hydroquinone according to reaction (14) is promoted. As an example, oxidizer $Ox_2$ is ubiquinone, noted U, having molecular formula $C_{59}H_{90}O_4$ and reducer $Red_2$ is the reduced form of ubiquinone, or ubiquinol, noted $UH_2$. In content 94, the reaction of oxidation of the reduced form of ubiquinone $UH_2$ into ubiquinone U according to the following reaction is promoted:

$$UH_2 \rightarrow U + 2H^+ + 2e^- \quad (20)$$

Membrane 98 is selected to prevent the migration of benzoquinone and hydroquinone. Solution 106 contains glucose. It for example is a biological solution. Glucose oxidase enzymes GOD are placed in content 94. Membrane 92 is selected to let through glucose and to prevent the migration of GOD enzymes, ubiquinone, and the reduced form of ubiquinone. Two glucose oxidation reactions take place in content 94. The first glucose oxidation reaction corresponds to the following reaction:

$$D\text{-glucose} + H_2O + O_2 \xrightarrow{\text{glucose oxidase}} D\text{-gluconic acid} + H_2O_2 \quad (21)$$

The second glucose oxidation reaction corresponds to the following reaction:

$$D\text{-glucose} + U \xrightarrow{\text{GOD}} \text{Gluconate} + UH_2 \quad (22)$$

Reaction (22) thus enables to regenerate the reduced form of ubiquinone in content 94.

Enzymes capable of promoting the forming of benzoquinone from hydroquinone are placed in solution 100. These for example are peroxidase enzymes. Membrane 98 is selected to prevent the migration of peroxidase enzymes but to let through hydrogen peroxide ($H_2O_2$). Peroxidase enzymes promote previously-described reaction (17). The hydrogen peroxide necessary for reaction (17) to take place originates from reaction (21) which occurs in content 94. In the present embodiment, dioxygen must be provided in content 94 so that reaction (21) can take place. Unlike in a conventional biofuel cell, the presence of dioxygen thus does not disturb the operation of biofuel cell 90.

According to an alternative embodiment, polyphenol oxidase enzymes which promote the production of benzoquinone in solution 100 from hydroquinone and oxygen are further provided in solution 100. This reaction may take place at the same time as reaction (17).

Biofuel cell 90 operates as follows. Initially, solution 100 may comprise identical concentrations of benzoquinone and hydroquinone, for example, in the form of benzoquinone/hydroquinone complexes, and content 94 may comprise identical concentrations of ubiquinone and of the reduced form of ubiquinone. The standard redox potential of the benzoquinone/hydroquinone redox couple is then substantially on the order of 0.7 V at 25° C. and the standard redox potential of couple $U/UH_2$ substantially is on the order of 0.5 V at 25° C.

Before electrodes 96, 102 are connected to load 104, regeneration reactions (22) and (17) take place. Thereby, the presence of the GOD enzyme, of D-Glucose, and of ubiquinone in content 94 results in the forming of ubiquinol $UH_2$ according to reaction (22). This results in an increase in the concentration of ubiquinol $UH_2$ along time. The ratio between the concentration of ubiquinone U and of ubiquinol $UH_2$ then tends to decrease, which decreases the redox potential of couple $U/UH_2$ (see equation (8)). Further, in solution 100, the peroxidase enzyme consumes hydrogen peroxide and hydroquinone according to reaction (17). Accordingly, the concentration of hydroquinone $QH_2$ decreases along time. The ratio between the concentration of benzoquinone Q and of hydroquinone $QH_2$ then tends to increase, which increases the redox potential of couple $Q/QH_2$ (see equation (6)). A potential difference is thus created between couple $Q/QH_2$ and couple $U/UH_2$ by only varying the concentrations of the oxidized or reduced forms of the redox couples. This potential difference created by influencing the concentration ratio adds to the potential difference due to the difference of the standard potentials of redox couples $Q/QH_2$ and $U/UH_2$.

When electrodes 96 and 102 are connected to load 104, reaction (14) of reduction of the benzoquinone then tends to take place in solution 100 and reaction (20) of oxidation of $UH_2$ then tends to take place in content 94. Simultaneously, regeneration reactions (22) and (17) take place.

Figure 11:
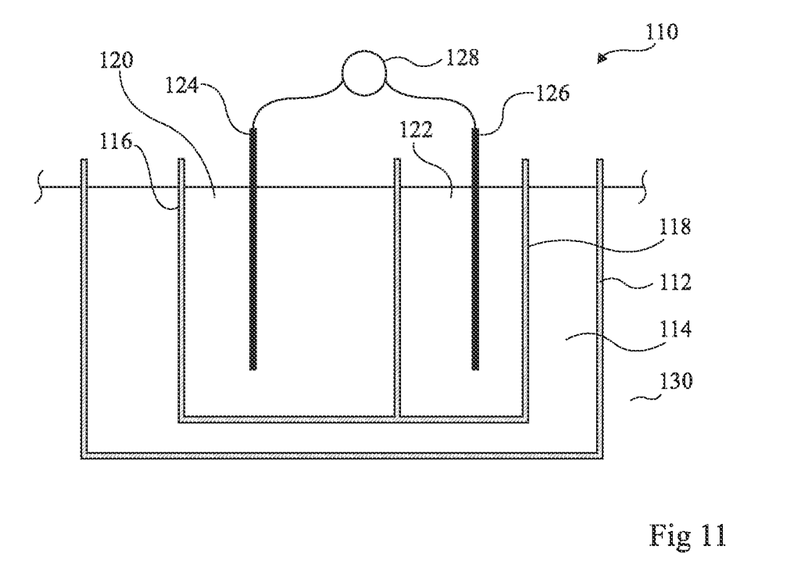

FIG. 11 schematically shows an embodiment of a biofuel cell 110 according to the invention. Biofuel cell 110 comprises a sac 112, formed of a semipermeable membrane and containing a solution 114. Two sacs 116, 118, formed of a semipermeable membrane, are placed in solution 114. Sacs 116, 118 may have a common wall. Sac 116 contains a solution 120 and sac 118 contains a solution 122. An electrode 124 is plunged in solution 120 and an electrode 126 is plunged in solution 122. Electrodes 124, 126 are connected to a load 128. Sac 112 is plunged in a solution 130.

A redox couple $Ox_1/Red_1$ is dissolved in solution 120 and a couple $Ox_2/Red_2$ is dissolved in solution 122. In the present embodiment, redox couples $Ox_1/Red_1$ and $Ox_2/Red_2$ are different. As an example, reducer $Red_1$ is hydroquinone, noted $QH_2$, and oxidizer $Ox_1$ corresponds to benzoquinone Q. In solution 120, the reduction of benzoquinone into hydroquinone according to reaction (14) is promoted.

As an example, reducer $Red_2$ is ascorbate, noted $AH_2$, of molecular formula $C_6H_8O_6$, and oxidizer $Ox_2$ is dehydroascorbate, noted A. In solution 122, the oxidation of ascorbate $AH_2$ into dehydroascorbate A according to the following reaction is promoted:

$$AH_2 \rightarrow A + 2H^+ + 2e^- \tag{23}$$

Membranes 116, 118 are selected to prevent the migration of benzoquinone, hydroquinone, ascorbate, and dehydroascorbate. Solution 130 contains glucose. It for example is a biological solution. GOD enzymes are placed in solution 114. Membrane 112 is selected to let through glucose and to prevent the migration of GOD enzymes.

In solution 114, the oxidation of glucose according to reaction (21) is promoted.

Enzymes capable of promoting the forming of benzoquinone from hydroquinone are placed in solution 120. These for example are peroxidase enzymes. Membrane 116 is selected to prevent the passing of peroxidase enzymes but to let through hydrogen peroxide ($H_2O_2$). Peroxidase enzymes promote previously-described reaction (17). The hydrogen peroxide necessary for reaction (17) to take place originates from reaction (21) which occurs in solution 114.

Proteins capable of promoting the forming of ascorbate AH2 from dehydroascorbate A according to the following reaction are placed in solution 122:

(24)

It for example is the enzyme corresponding to the disulfide isomerase or PDI protein.

Biofuel cell 110 operates as follows. Initially, solution 120 may comprise identical concentrations of benzoquinone and hydroquinone, for example, in the form of benzoquinone/hydroquinone complexes, and solution 122 may comprise identical concentrations of ascorbate and of dehydroascorbate. The redox potential of the benzoquinone/hydroquinone redox couple is then substantially on the order of 0.7 V and the redox potential of couple $A/AH_2$ substantially is on the order of −0.29 V.

Before electrodes 124, 126 are connected to load 128, regeneration reactions (24) and (17) take place. Thereby, in solution 122, the forming of ascorbate $AH_2$ according to reaction (24) can be observed. Accordingly, the concentration of ascorbate $AH_2$ increases along time. The ratio between the concentration of dehydroascorbate A and of ascorbate $AH_2$ then tends to decrease, which decreases the redox potential of couple $A/AH_2$ (see equation (8)). Further, in solution 120, the peroxidase enzyme consumes hydrogen peroxide and hydroquinone according to reaction (17). Accordingly, the concentration of hydroquinone $QH_2$ decreases along time. The ratio between the concentration of benzoquinone Q and of hydroquinone $QH_2$ then tends to increase, which increases the redox potential of couple $Q/QH_2$ (see equation (6)). A potential difference is thus created between couple $Q/QH_2$ and couple $A/AH_2$ by simple variation of the concentrations of the oxidized or reduced forms of the redox couples. This potential difference created by influencing the concentration ratio adds to the potential difference due to the difference of the standard potentials of redox couples $Q/QH_2$ and $A/AH_2$.

When electrodes 124 and 122 are connected to load 128, reaction (14) of reduction of the benzoquinone then tends to take place in solution 120 and reaction (23) of oxidation of $AH_2$ then tends to take place in solution 122. Simultaneously, regeneration reactions (24) and (17) take place and renew the chemical species.

Examples of application will now be described, for which the use of the biofuel cell according to the present invention is particularly advantageous.

The biofuel cell is particularly well adapted to an implantation in the human body. In this case, enclosure 12 may correspond to a flexible membrane, for example, of the type used for dialysis operations.

The biofuel cell may correspond to a power source for a portable electronic system, such as a cell phone, a walkman, a camera, or a camcorder. The electronic system may comprise a conventional main power source capable of providing a significant power, and a biofuel cell, used as a secondary power source. The biofuel cell can then be used to power the electronic system in an operating mode where the electronic system only requires a low consumption. This for example corresponds to the stand-by mode of a cell phone for which the telephone display is generally off.

The biofuel cell can be integrated to any support, the biofuel cell operation being initiated when the support is in contact with a solvent containing the elements necessary for the reactions causing a pH variation to take place. As an example, the biofuel cell according to the present invention may be integrated to paper or to a fabric. The biofuel cell operation can then be initiated at the contact of an individual's sweat.

Specific embodiments of the present invention have been described. Various alterations and modifications will occur to those skilled in the art. In particular, a biofuel cell according to the present invention may comprise some elements of one of the previously-described embodiments and other elements of another example from among the previously-described embodiments. As an example, an embodiment of a biofuel cell according to the invention may comprise a cathode having the same structure as the cathode of the biofuel cell shown in FIG. 9 and an anode having the same structure as the anode shown in FIG. 1.

The invention claimed is:

1. A cell comprising:
    first and second chambers containing a solvent and separated by a wall permeable to the solvent and impermeable to hydronium and/or hydroxyl ions;
    a first electrode at least partly arranged in the first chamber;
    a second electrode at least partly arranged in the second chamber;
    a first redox couple placed in the first chamber in contact with the solvent and comprising a first oxidizer and a first reducer taking part in first oxidation-reduction reactions resulting in an electron exchange with the first electrode;
    a second redox couple placed in the second chamber in contact with the solvent and comprising a second oxidizer and a second reducer taking part in second oxidation-reduction reactions resulting in an electron exchange with the second electrode, said wall being impermeable to the first and second redox couples; and
    first enzymes or first microorganisms placed in the first chamber or in the second chamber and promoting third oxidation-reduction reactions different from the first and second oxidation-reduction reactions resulting in the transformation of a first substance to provide a second substance comprising acid or alkaline species, which results in a pH variation and in a consecutive variation of the redox potential.

2. The cell of claim 1, wherein the first oxidizer is a quinone and wherein the first reducer is a reduced form of said quinone.

3. The cell of claim 1, wherein the first substance is D-glucose and wherein the first enzymes are glucose oxidase enzymes capable of causing the production of hydronium ions by oxidation of the D-glucose.

4. The cell of claim 1, wherein the first substance is L-glucose and wherein the first enzymes are L-fucose dehydrogenase enzymes capable of causing the production of hydronium ions by oxidation of the L-glucose.

5. The cell of claim 1, wherein the first substance is urea and wherein the first enzymes are urease enzymes capable of causing the production of hydroxyl ions by degradation of the urea.

6. The cell of claim 1, wherein the first and second redox couples are identical.

7. The cell of claim 1, wherein the first chamber comprises a membrane permeable to the solvent, non-permeable to the first enzymes or to the first microorganisms, and delimiting a solvent volume in which the first electrode is plunged, the first redox couple being dissolved in said volume, the first enzymes or the first microorganisms being placed outside of said volume.

8. The cell of claim 1, wherein the first redox couple is placed at the level of a solid or gel phase at least partially surrounding the first electrode.

9. The cell of claim 1, wherein the first device for varying the pH in the first chamber comprises the first enzymes or the first microorganisms capable of transforming the first substance to provide hydronium ions in the solvent of the first chamber, the cell comprising a second device for varying the pH in the second chamber comprising second enzymes or second microorganisms capable of transforming a third substance to provide hydroxyl ions in the solvent of the second chamber.

10. The cell of claim 9, comprising:
    a third device for varying the pH in the first chamber comprising third enzymes or third microorganisms, possibly identical to the second enzymes or to the second microorganisms, capable of transforming a fourth substance, possibly identical to the third substance, to provide hydroxyl ions in the solvent of the first chamber;
    a fourth device for varying the pH in the second chamber comprising fourth enzymes or fourth microorganisms, possibly identical to the first enzymes or to the first microorganisms, capable of transforming a fifth substance, possibly identical to the first substance, to provide hydronium ions in the solvent of the second chamber; and
    a device capable of actuating the first and second devices while blocking the third and fourth devices and of actuating the third and fourth devices while blocking the first and second devices.

11. The cell of claim 1, comprising a device for regenerating the first oxidizer or the first reducer comprising fifth enzymes or fifth microorganisms capable, in the case where the first reactions comprise the reduction of the first oxidizer into the first reducer, of transforming the first reducer into the first oxidizer and, in the case where the first reactions comprise the oxidation of the first reducer into the first oxidizer, of transforming the first oxidizer into the first reducer.

12. The cell of claim 1, wherein the fifth enzymes are tyrosinase- or peroxidase-type enzymes capable of promoting the oxidation of the reduced form of said quinone into said quinone with a consumption of dioxygen or of hydrogen peroxide.

13. The cell of claim 1, comprising a pathway connecting the first chamber to the second chamber, the pathway being provided with a valve that can be controlled to be opened.

14. The cell of claim 1, comprising sixth enzymes or sixth microorganisms capable, in the case where the first reactions comprise the reduction of the first oxidizer into the first reducer, of transforming the first reducer into the first oxidizer with a consumption of the second substance and, in the case where the first reactions comprise the oxidation of the first reducer into the first oxidizer, of transforming the first oxidizer into the first reducer with a consumption of the second substance.

15. The cell of claim 14, wherein the first oxidizer is ubiquinone and the first reducer is ubiquinol, the first substance being glucose and the second substance being hydrogen peroxide, the first enzymes being glucose oxidase enzymes capable of causing the production of hydrogen peroxide from glucose, and wherein the second oxidizer is a quinone and the second reducer is a reduced form of said quinone, the sixth enzymes corresponding to peroxidase enzymes capable of oxidizing the reduced form of said quinone into said quinone with a consumption of hydrogen peroxide.

16. The cell of claim 14, wherein the first oxidizer is dehydroascorbate and the first reducer is ascorbate, the first substance being glucose and the second substance being hydrogen peroxide, the first enzymes being glucose oxidase enzymes capable of causing the production of hydrogen peroxide from glucose, and wherein the second oxidizer is a quinone and the second reducer is a reduced form of said quinone, the sixth enzymes corresponding to peroxidase enzymes capable of oxidizing the reduced form of said quinone into said quinone with a consumption of hydrogen peroxide.

* * * * *